United States Patent
Konagaya

(10) Patent No.: US 7,224,500 B2
(45) Date of Patent: May 29, 2007

(54) IMAGE READER FOR READING AN IMAGE RECORDED ON AN ORIGINAL

(75) Inventor: Tatsuya Konagaya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 922 days.

(21) Appl. No.: 10/081,242

(22) Filed: Feb. 25, 2002

(65) Prior Publication Data
US 2002/0122216 A1    Sep. 5, 2002

(30) Foreign Application Priority Data
Mar. 2, 2001    (JP)    ............................. 2001-057689

(51) Int. Cl.
 H04N 1/04    (2006.01)
 H04N 1/46    (2006.01)
(52) U.S. Cl. ...................... 358/475; 358/482; 358/483; 358/514
(58) Field of Classification Search ................ 358/475, 358/482, 483, 514
See application file for complete search history.

(56) References Cited

U.S. PATENT DOCUMENTS

| | | | | |
|---|---|---|---|---|
| 5,475,508 A | * | 12/1995 | Maeshima et al. | 358/514 |
| 5,724,152 A | * | 3/1998 | Hayashi et al. | 358/296 |
| 6,438,256 B1 | * | 8/2002 | Rubin et al. | 382/108 |
| 6,650,443 B1 | * | 11/2003 | Izumi | 358/475 |

* cited by examiner

Primary Examiner—Jerome Grant
Assistant Examiner—Houshang Safaipour
(74) Attorney, Agent, or Firm—Sughrue Mion, PLLC

(57) ABSTRACT

A CCD scanner is provided with a regulating circuit, which stores electric-current set values of LED elements of respective colors. The regulating circuit also stores desired values corresponding to optimum light amounts of the LED elements of the respective colors. By utilizing the electric-current set value and the desired value, binary search is performed for the LED elements every color. During the binary search, the light amount of the LED element is regulated, and an electric-current value thereof is determined so as to obtain the optimum light amount. By using the determined electric-current value, the LED element is turned on to read an image.

22 Claims, 7 Drawing Sheets

IMAGE READER FOR READING AN IMAGE RECORDED ON AN ORIGINAL

BACKGROUND OF THE INVENTION

1. Field of the Invention

The present invention relates to an image reader for reading an image recorded on a transparency of a photographic film or the like.

2. Description of the Related Art

An image reader employing an imaging device of a CCD and so forth is used for photoelectrically reading an image recorded on a transparency of a photographic film or the like. Image processing of scaling, correction processing and so forth are executed on image data obtained by the image reader. On the basis of the processed image data, an image is formed on a recording material.

In the image reader, pre-scanning and fine scanning are performed. During the pre-scanning, the image is preliminarily read for the purpose of reading the image with accuracy. During the fine scanning, the image is read under read conditions determined in accordance with density of the image.

As to a light source employed in the image reader, a conventional halogen lamp is used. Beside the halogen lamp, a light source in which LED elements are arranged is used. The LED elements emit the light of each color of red, green and blue. By employing the light source constituted of the LED elements, the device itself may be downsized. Further, there is an advantage that the lifetime of the light source is prolonged in comparison with the case of the halogen lamp.

However, when the light source constituted of the LED elements is used, mechanical performance thereof disperses in comparison with the case of the halogen lamp. Due to this, in some of the light sources, accuracy of reading the image deteriorates and readout time becomes long. Meanwhile, it is considered that a light amount of the light source is regulated by means of a volume such as a conventional analog printer employing the halogen lamp. In this case, however, it is necessary for the light source constituted of the LED elements to provide a plurality of volumes relative to the respective colors. In addition, it is also necessary to individually adjust the volumes. Thus, there arises a problem in that adjusting the volumes is troublesome.

SUMMARY OF THE INVENTION

In view of the foregoing, it is a primary object of the present invention to provide an image reader in which dispersion of mechanical performance due to LED elements is reduced.

It is a second object of the present invention to provide an image reader in which an image is read with a light amount being equal to an initial amount, even if performance of LEDs deteriorates.

In order to achieve the above and other objects, the image reader according to the present invention comprises a light source, an imaging device, and a regulation member for regulating a light amount of the light source. The light source includes a plurality of light emitting elements and emits the light toward an original set to a read position. The imaging device receives the light having passed through the original of the read position. The regulation member changes an electric-current value of the light source so as to make an output value of the imaging device converge within a predetermined range. The electric-current value regulated by the regulation member is used when an image of the original is read.

In a preferred embodiment, the light source includes the light emitting elements for emitting the light of red, green, blue and infrared. The light amount of the light source is regulated with respect to the light emitting elements of the respective colors. Moreover, the light amount is regulated by means of binary search.

Charge storage time of the imaging device is fixed when the light amount is regulated. The charge storage time is determined so as to be shorter in an order of infrared, red, green, and blue. In the meantime, when the image of the original is read, pre-scanning and fine scanning are performed. In the pre-scanning, the image is preliminarily read. In the fine scanning, the image is read under a read condition determined on the basis of the pre-scanning. The light amount is preferable to be regulated in accordance with a measurement result of the pre-scanning.

According to the image reader of the present invention, the light amount may be regulated in accordance with deterioration of the light emitting element constituting the light source so that it is possible to always read the image with the optimum light amount. Moreover, by the binary search, the light amount is mechanically regulated so that a period for regulating the light amount may be shortened. Further, mechanical performance of the light emitting elements is prevented from dispersing so that it is possible to read the image in high quality without modifying the apparatus itself.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
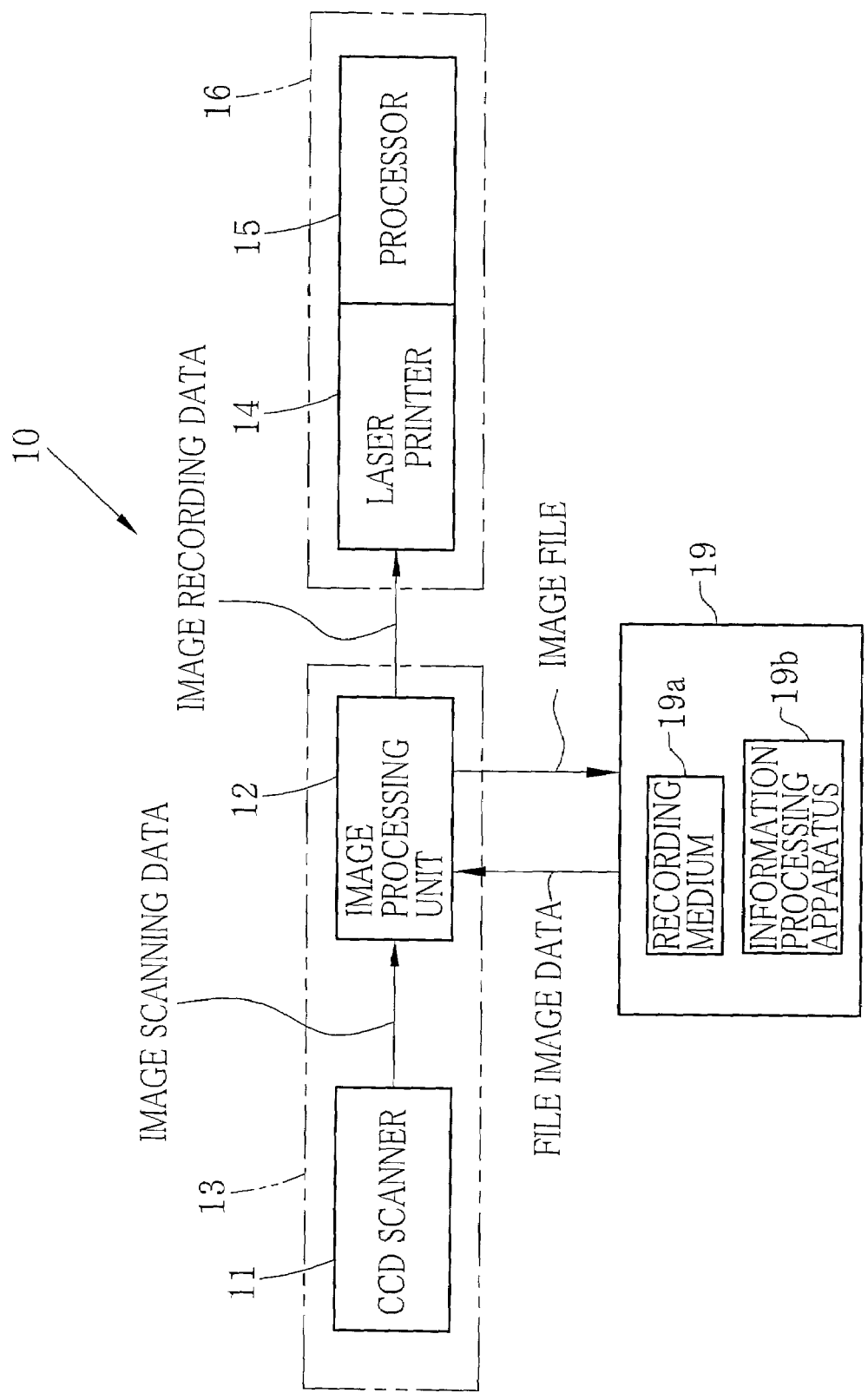
FIG. 1 is a block diagram showing a structure of a digital laboratory system according to the present invention.

FIG. 1 is a block diagram showing a schematic structure of a digital laboratory system 10 including an image reader according to the present invention. The digital laboratory system 10 comprises the image reader 13 and an output apparatus 16. The image reader 13 includes a CCD scanner 11 and an image processing unit 12. The output apparatus 16 includes a laser printer 14 and a processor 15.

The CCD scanner 11 is for reading an image recorded on a photographic film of a negative film, a reversal film and so forth. For instance, it is possible to read an image of a 135-size photographic film and an IX240-type photographic film. In addition, it is also possible to read an image of various photographic films of 110-size, 120-size, 220-size (Brownie size), and so forth. Incidentally, the CCD scanner 11 is capable of reading a slide-mount photographic film by using an exclusive mount carrier.

The image processing unit 12 executes various image processing of correction and so forth on image data outputted from the CCD scanner 11. At the time of pre-scanning, the image processing unit 12 determines read conditions for fine scanning on the basis of the image data. Under the determined read conditions, fine scanning is performed for the image of the photographic film. After image processing, the image is outputted to the laser printer 14 as image recording data. As to the image processing, there are graybalance adjustment, gradation correction, density (brightness) adjustment, light-source correction based on matrix (MTX), and saturation adjustment (color adjustment) of the image. In addition, are executed an electronic process for varying magnification, a dodging process (compression/expansion for a dynamic range of density), a sharpness process, and so forth. In these processes, a low-pass filter, an adder, an LUT, MTX and so forth are used, and by properly combining them, a mean process, an interpolation operation and so forth are also executed.

The image processing unit 12 is capable of outputting the processed image data to an external apparatus 19 as an image file. For instance, the image processing unit 12 records the processed image data in a recording medium 19a of a memory card, a CD-ROM, or the like. In another way, the image processing unit 12 sends the processed image data to an information processing apparatus 19b via a communication channel.

The laser printer 14 comprises laser-beam sources of red, green and blue, and a modulator. A laser of the laser-beam source is modulated by the modulator on the basis of the image recording data. With the modulated light, exposure scanning is exposed for a photographic paper to record the image. The processor 15 executes various processes on the exposed photographic paper in order to develop it. The above-noted various processes include color development, bleach-fix, washing, and drying. In this way, the image is formed on the photographic paper.

Figure 2:
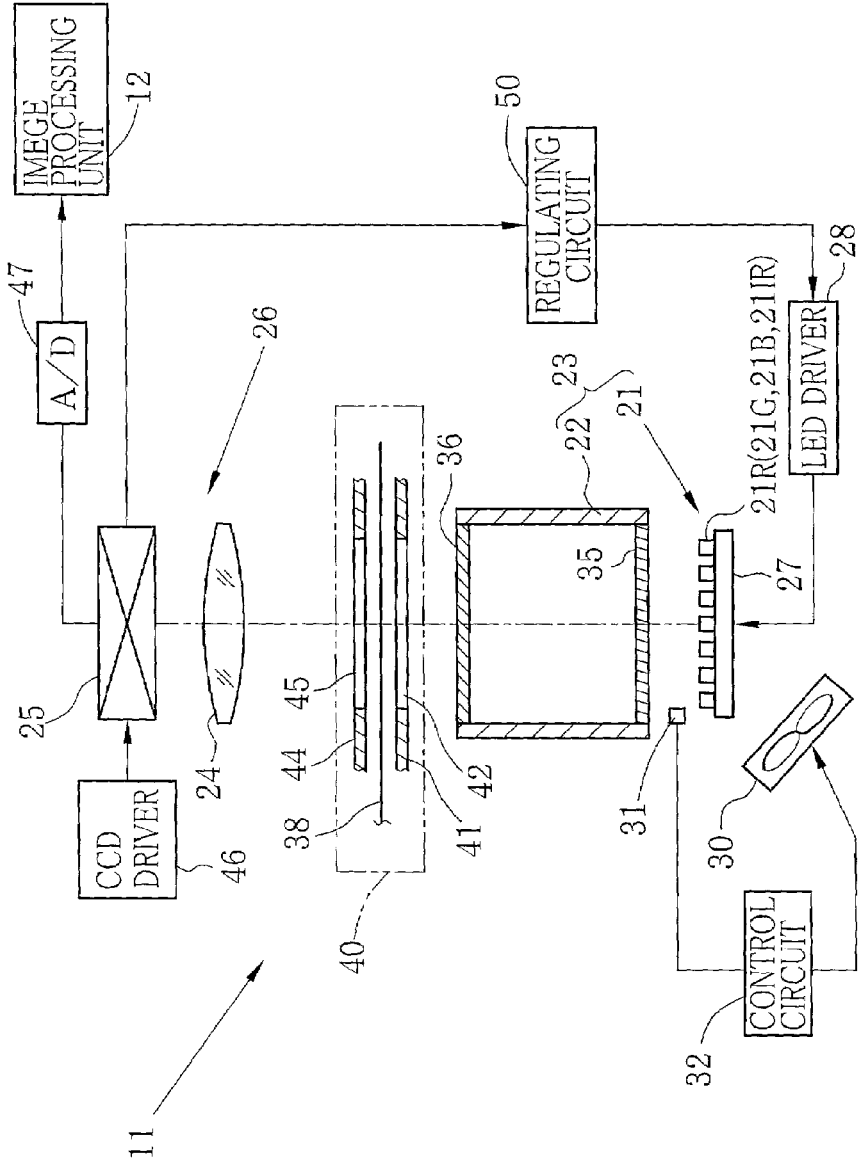
FIG. 2 is an explanatory illustration showing a structure of a CCD scanner.

FIG. 2 is an explanatory illustration showing an optical structure of the CCD scanner 11. The CCD scanner 11 comprises a light-source section 23 and an imaging section 26. The light-source section 23 includes a light source 21 and a diffusion box 22. The imaging section 26 includes a lens unit 24 and an area CCD 25.

The light source 21 has a plurality of LED elements 21R, 21G, 21B, and 21IR, which are arranged on a base plate 27 in matrix. The LED elements 21R, 21G, 21B, and 21IR respectively emit the light of each color of red (R), green (G), blue (B), and infrared (IR). By individually turning on the LED elements 21R, 21G, 21B, and 21IR, it is possible to respectively emit the red light, the green light, the blue light, and the infrared light to the photographic film. Incidentally, reference numeral 28 denotes an LED driver. In this embodiment, a light amount of the light source 21 is set to eighty percent of the maximum light amount thereof.

The LED element 21IR of the infrared light is used for detecting a scratch and dust existing on the image. When an output value of the area CCD 25 falls below a threshold value, a pixel corresponding to the image data of R, G, and B is corrected by means of interpolation and so forth.

A cooling fan 30 is disposed under the light source 21. A light amount and emission spectrum of the LED element are likely to change in accordance with fluctuation of temperature. In view of this, the cooling fan 30 is rotated to keep a temperature of the light source 21 within a predetermined range so that the light amount and the emission spectrum of the LED element are fixedly retained. The cooling fan 30 is controlled on the basis of a detection value of a temperature sensor 31, for example a thermistor, disposed near the light source 21. Incidentally, reference numeral 32 denotes a control circuit for the cooling fan 30.

The diffusion box 22 is disposed above the light source 21. The diffusion box 22 comprises a first diffusion plate 35 being perpendicular to an optical axis, and a second diffusion plate 36 through which the light is emitted as diffused light toward a photographic film 38 placed at a read position. Since the light emitted from the diffusion box 22 is the diffused light, unevenness of the light amount is reduced on the photographic film 38 so that the light is uniformly emitted to the photographic film 38. At the same time, even if the photographic film 38 is scratched, this scratch becomes inconspicuous.

Above the diffusion box 22, a film carrier 40 is disposed to advance the photographic film 38 to be read. The film carrier 40 advances the photographic film frame by frame to move each image to the read position located at the optical axis. By the way, it is possible to perform manual printing, in which the image set to the film carrier 40 is sometimes shifted from the read position. If the image is shifted from the read position in manual printing, the image may be finely adjusted by operating a fine-adjustment key (not shown) provided on the film carrier 40.

A lower mask 41 is disposed at a lower portion of the film carrier 40. The lower mask 41 has a mask opening 42 formed at a central portion thereof. The lower mask 41 is located such that the center of the mask opening 42 coincides with the optical axis.

An upper mask 44 is disposed above the photographic film 38. The upper mask 44 has a shape similar to that of the lower mask 41. While the photographic film 38 is advanced, the upper mask 44 evacuates above the film carrier 40. When the image is read, the upper mask 44 moves downward to hold the photographic film 38 of the read position with the lower mask 41. Incidentally, reference numeral 45 denotes a mask opening of the upper mask 44.

Above the film carrier 40, the lens unit 24 and the area CCD 25 are disposed in this order along the optical axis. The lens unit 24 forms the image, which is recorded on the photographic film 38, on a light-receiving surface of the area CCD 25. The lens unit 24 is adapted to move along the optical axis by means of a lens motor (not shown). By moving the lens unit 24, magnification is varied. Meanwhile, focusing is performed by changing a distance (conjugate length) between the photographic film 38 and the area CCD 25.

The area CCD 25 is constituted of a plurality of CCD cells arranged in matrix. The area CCD 25 is controlled by a CCD driver 46 to read the image of the photographic film 38 every color. In the fine scanning, charge storage time of the area CCD 25 is 90 msec when the R-light is emitted, and is 40 msec when the G-light is emitted, and is 20 msec when the B-light is emitted, for example. During the fine scanning, the respective pixels are individually taken in. By contrast, during the pre-scanning, four pixels are simultaneously taken in, for example. Accordingly, in the pre-scanning, the charge storage time of the area CCD 25 is 22.5 msec when the R-light is emitted, and is 10 msec when the G-light is emitted, and is 5 msec when the B-light is emitted, for example. The image data of each color read by the area CCD 25 is outputted to the image processing unit 12 via an A–D converter 47.

A regulating circuit 50 stores, in advance, electric-current set values Ei0 to Ei255 ("i" is one of R, G, and B) of the respective LED elements 21R, 21G and 21B. The set values Ei0 to Ei255 are stored with respect to the LED elements of each color as table data of 256 grades. In addition, the regulating circuit 50 also stores desired values LPi±Ai ("A" is an allowable value) which are the optimum light amounts of the respective LED elements 21R, 21G and 21B. When the light amount is regulated, binary search is executed by using the data, and electric-current values of the respective LED elements are determined so as to obtain the optimum light amounts.

Figure 3:
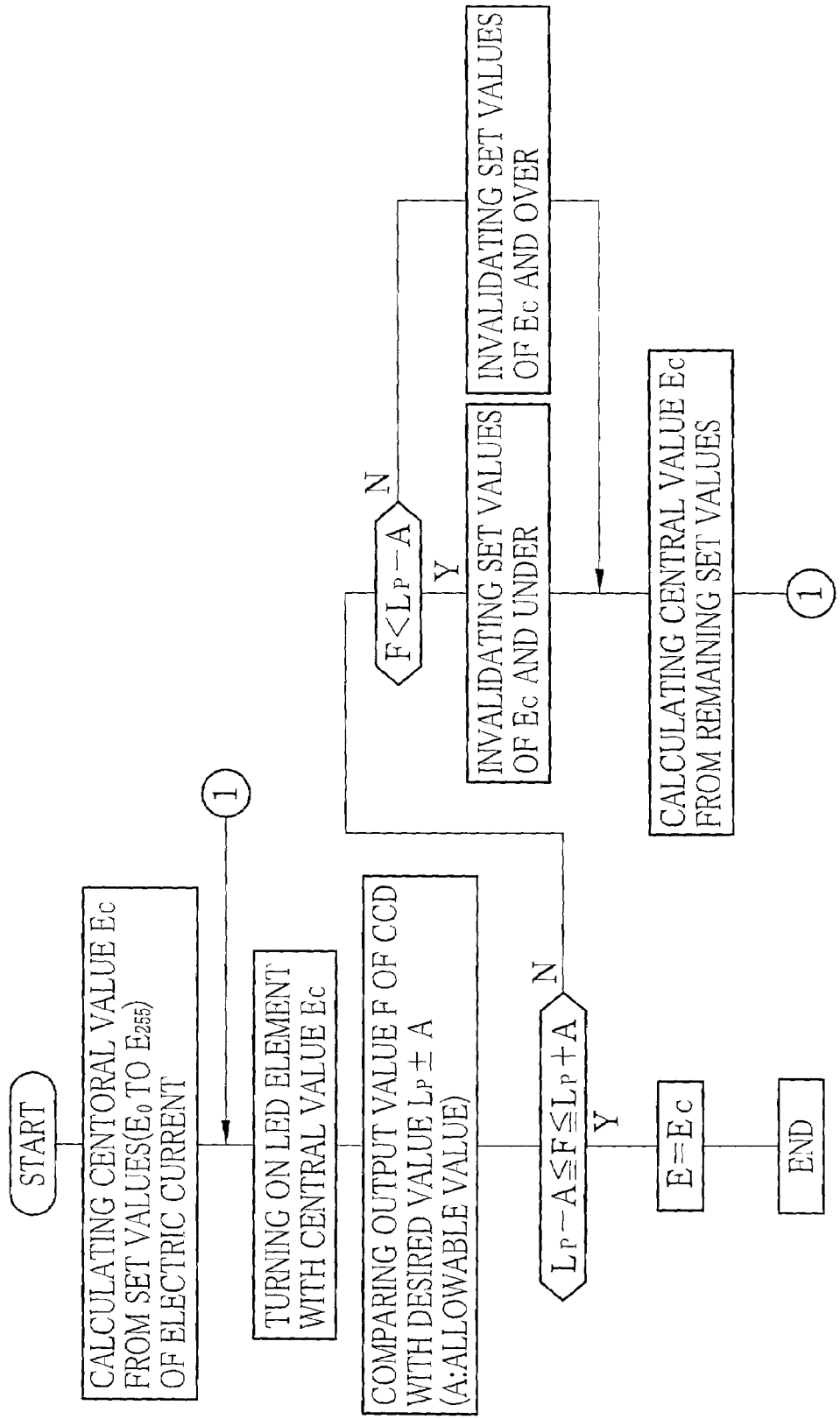
FIG. 3 is a flow chart showing a process for regulating a light amount by means of binary search.

Next, an operation of the present embodiment is described below. The light amount of the light source 21 is regulated in both of the pre-scanning and the fine scanning by means of the binary search. Moreover, the light amount of the light source 21 is also regulated when the light source 21 emits the light for adjusting the position of the shifted image at the time of manual printing. Such as shown in FIG. 3, in the regulating circuit 50, an electric-current value Ec regarded as a central value of the electric-current set values is calculated from the table data. In accordance with the electric-current value Ec, the red-LED element 21R is turned on first. Successively, an output value F of the area CCD 25 is compared with the desired value LPR±AR. When the output value F is less than the minimum value LPR−AR of the desired value, the electric-current set values of the central value Ec and under are invalidated. Then, the central value Ec is calculated once again from the remaining electric-current set values. By using the newly calculated central value Ec, the red-LED element 21R is turned on to perform the similar operation. This operation is repeated for several times to determine the electric-current value E being as the optimum value.

When the output value F exceeds the maximum value LPR+AR of the desired value, the electric-current set values of the central value Ec and over are invalidated. And then, the central value Ec is calculated once again from the remaining electric-current set values. By using the newly calculated central value Ec, the red-LED element 21R is turned on to perform the similar operation. This operation is repeated for several times to determine the electric-current value E being as the optimum value. After regulating the light amount of the red-LED element, the electric-current values of the green-LED element 21G and the blue-LED element 21B are regulated in order. At this time, the charge storage time of the area CCD 25 is that of the pre-scanning. Concretely, the charge storage time is 22.5 msec when the R-light is emitted, and is 10 msec when the G-light is emitted, and is 5 msec when the B-light is emitted, for example. Incidentally, the light amounts may be individually regulated in each of the fine scanning and the pre-scanning to individually determine the electric-current values of the LED elements of the respective colors.

After regulating the light amount in the pre-scanning and the fine scanning, the light amount of the light source 21 used for adjusting the image position in the manual printing is regulated. At this time, the light emitted from the light source 21 is one of the red light, the green light and the blue light. The charge storage time of the area CCD 25 is that of the pre-scanning. Incidentally, the charge storage time of the area CCD 25 may be that of the fine scanning. Alternatively, the charge storage time may be newly set. Regulating the light amount is completed in this way, and the image of the photographic film 38 is read by using the electric-current value newly determined.

In the above embodiment, the light amount is regulated with respect to the LED elements of red, green and blue. However, the light amount may be also regulated with respect to the LED element of infrared. When the charge storage time of the infrared-LED element 21IR is represented by TIR, the charge storage time of the area CCD 25 is determined such as to be T$_{IR}$>T$_R$>T$_G$>T$_B$. The electric-current value for turning on the infrared-LED element 21IR may be fixed from the beginning.

In the above embodiment, the color of the LED element turned on for adjusting the image position in the manual operation is one of red, green and blue. However, the light of three colors may be simultaneously emitted. By doing so, the light amounts of the respective LED elements 21R, 21G and 21B are held down so that the lifetime of the respective LED elements is prolonged.

Figure 4:
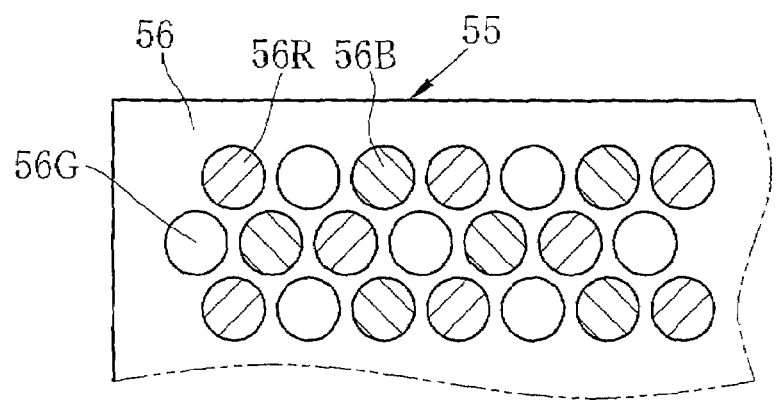
FIG. 4 is a front view showing an example in that coloring layers of red, green and blue are formed on an EL element in turn.
Figure 5:
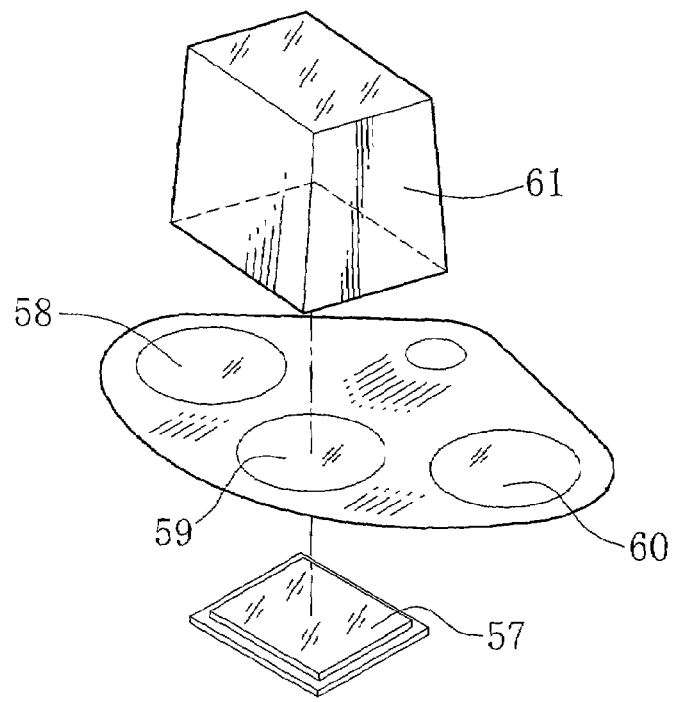
FIG. 5 is a perspective view showing another example in that an EL element emitting white light is used together with filters of red, green, and blue.

In the above embodiment, the LED elements of red, green and blue are used as the light source. However, the LED element is not exclusive. An electroluminescence (EL) element may be used, for instance. FIG. 4 shows an example of an arrangement of coloring layers of red(R), green(G) and blue(B). A coloring layer 56 of an organic EL element 55 is constituted of coloring layers 56R, 56G and 56B of the respective colors. The coloring layers 56R, 56G and 56B are arranged in matrix so as to individually emit the light of each color. Owing to this, it is possible to hold down a driving power. Moreover, brightness is high and the lifetime of the element itself is long so that it is possible to supply a stable amount of the light for a long time. Meanwhile, as shown in FIG. 5, the light of each color may be emitted from another EL element 57 toward an image original via filters 58, 59, 60 of red, green and blue. The EL element 57 emits the white light in a frame illumination manner. In front of the EL element 57, the filters 58, 59 and 60 of the respective colors are disposed. Incidentally, reference numeral 61 denotes a diffusion box.

Figure 6:
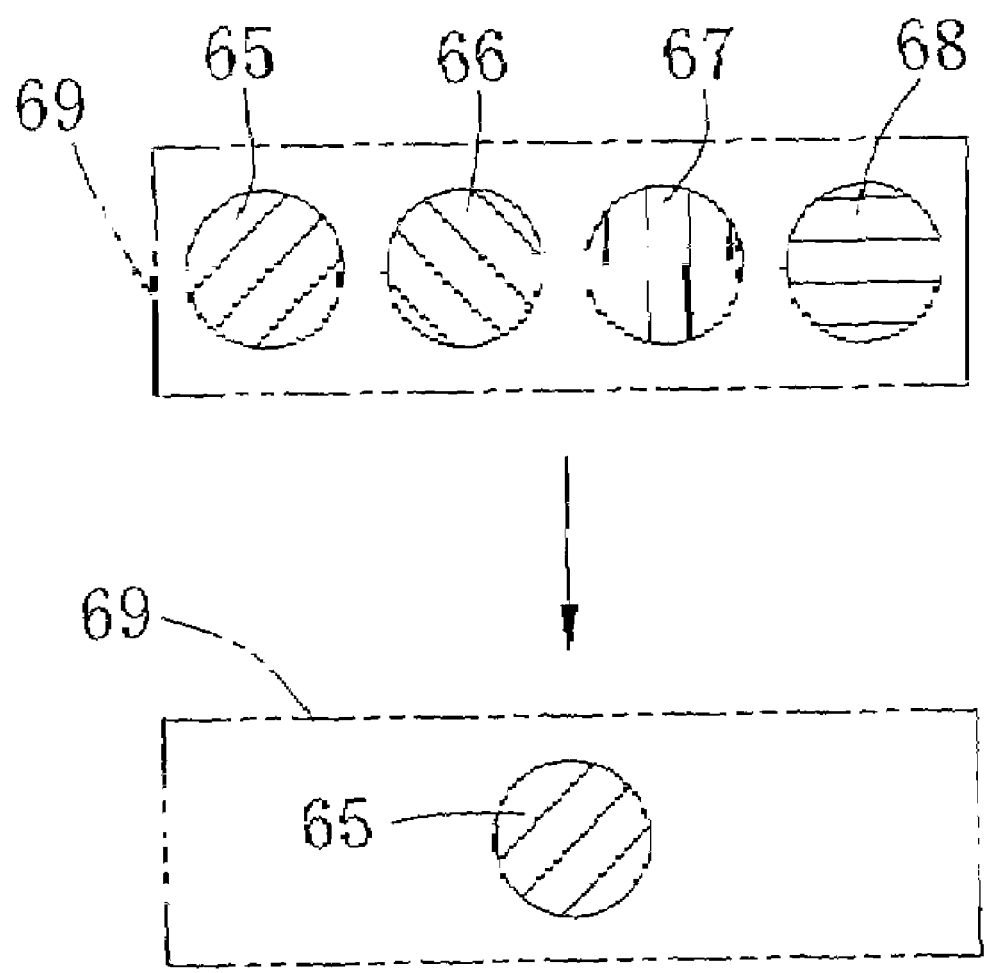
FIG. 6 is an explanatory illustration showing a thinning process executed on an image read by fine scanning.

In the foregoing embodiment, four pixels are simultaneously picked up while pre-scanning is performed. However, the pixels may be thinned when being picked up. For example, as shown in FIG. 6, the sole pixel 65 is picked up from a group 69 constituted of the adjacent four pixels 65 to 68. In virtue of this, it is possible to perform the pre-scanning in a short period. Moreover, it is also possible to shorten a processing time of shading correction when processing the image, since the pixels of the obtained image data are thinned for the shading correction. Incidentally, when the pixels are thinned, two or three pixels may be picked up from four pixels.

Figure 7:
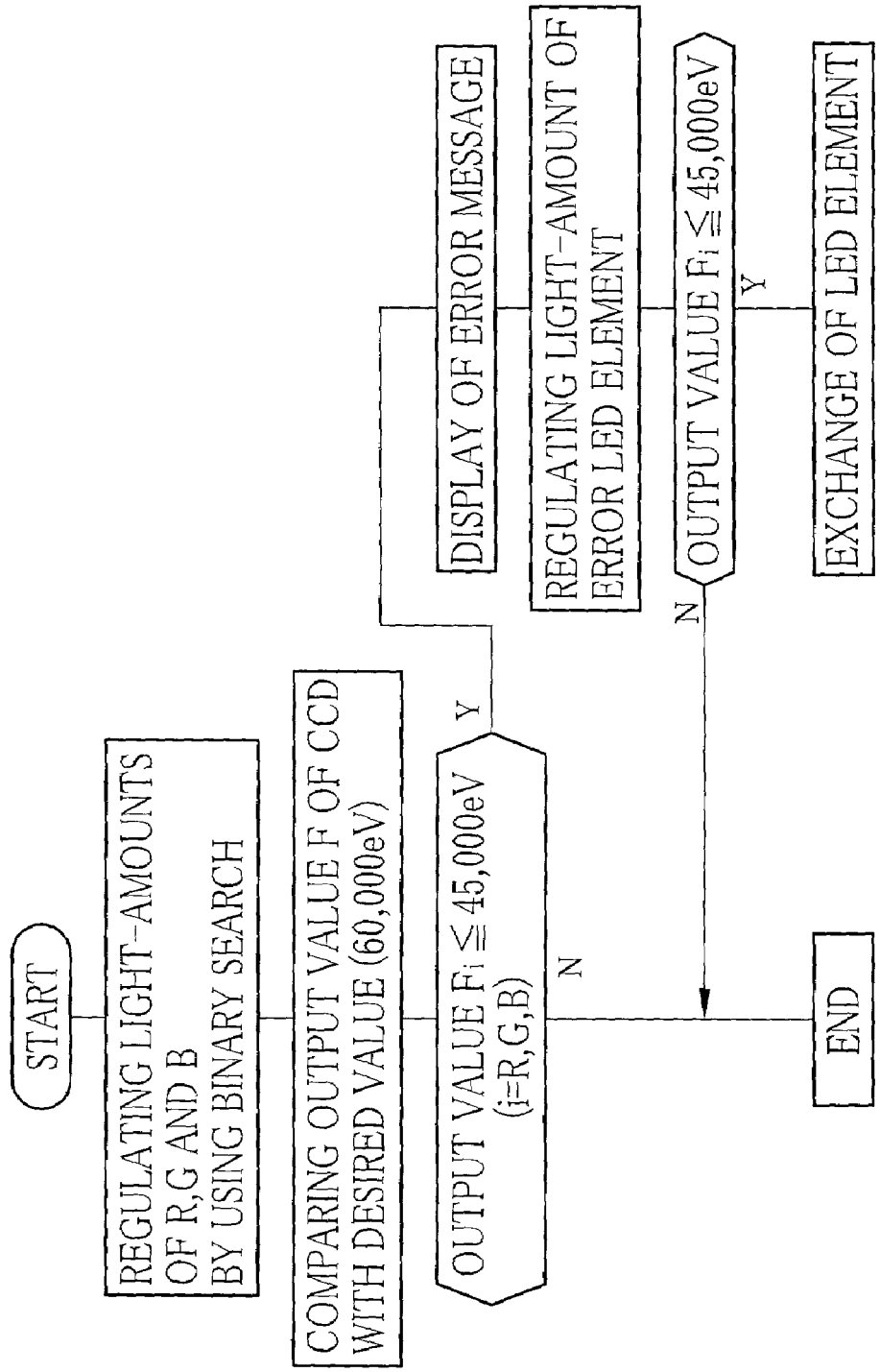
FIG. 7 is a flow chart showing a process for comparing a light amount with a desired value after regulating the light amount on the basis of binary search.
Figure 8:
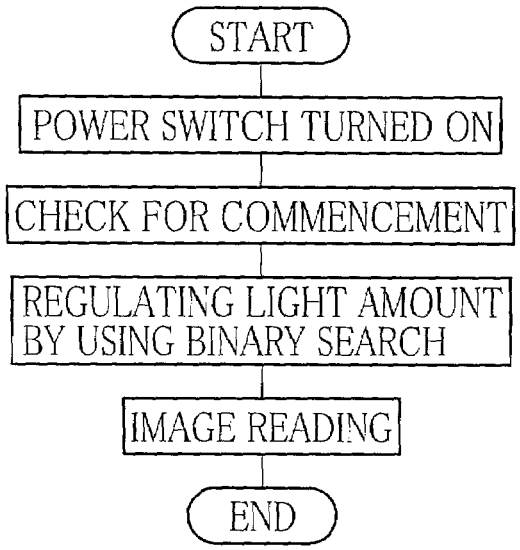
FIG. 8 is a flow chart showing a process for regulating the light amount when starting up an image reader.
Figure 9:
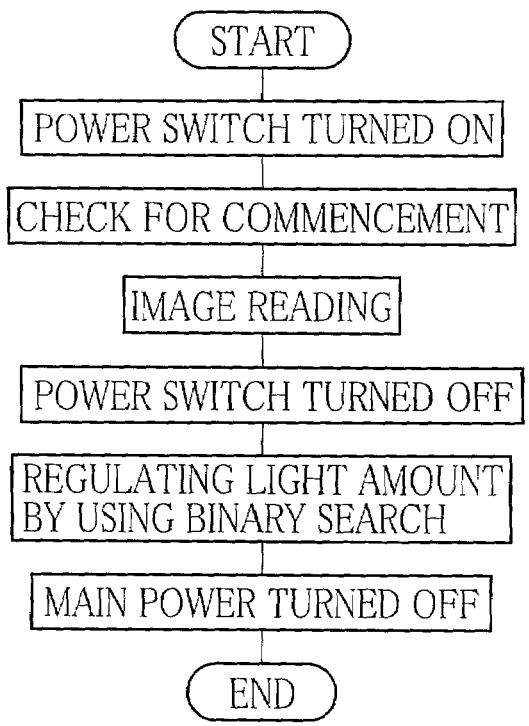
FIG. 9 is a flow chart showing a process for regulating the light amount just before turning off the image reader.

In the foregoing embodiment, the light amount is regulated to set the electric-current value of the LED element. In case a light-emission amount of the LED element declines more than a prescribed value, the light amount may be regulated again. When the light amount is regulated, the charge storage time of the CCD is set, for example, to be 13.3 msec when the red-light is emitted, and to be 11 msec when the green-light is emitted, and to be 7 msec when the blue-light is emitted. The electric-current value of each LED element is adjusted such that a received-light amount of the respective colors, which is obtained during the above-noted charge storage times, becomes 60,000 eV. Such as shown in FIG. 7, when the received-light amount declines to 45,000 eV after regulating the light amount, an error message is displayed on a monitor, for instance. And then, the light amount is regulated again with respect to the LED element of the corresponding color. If the light amount is 45,000 eV or less despite the second light-amount regulation, the LED element is exchanged. Incidentally, without displaying the error message on the monitor, the light amount may be automatically regulated again.

The light amount may be regulated when starting up the image reader or when turning off a power supply. In a case the light amount is regulated when starting up the image reader, the light amount is regulated after a main power has been turned on by operating a power switch, and after the apparatus itself has been initially checked. After regulating the light amount, reading the image is started. In another case, the light amount is regulated when turning off the power switch after reading the image. In this case, upon completion of the light-amount regulation, the main power is turned off. By the way, the light amount may be regulated whenever the original is scanned. It is also possible to regulate the light amount when the image reader is kept in a waiting state.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image reader for reading an image recorded on an original, comprising:
   a light source for emitting a light toward said original;
   an imaging device for receiving the light emitted from said light source and having passed through said original; and
   light-amount regulating means for regulating a light amount of said light source, said light-amount regulating means setting an electric-current value of said light source so as to make an output value of said imaging device converge within a predetermined range,
   wherein said electric-current value of said light source is used when reading said image, and
   wherein said light-amount regulating means is further configured to:
     store at least one electric-current set value of said light source and the predetermined range;
     calculate a central value from said at least one electric-current set value;
     compare the predetermined range with a first output value of said image device which is obtained using said central value;
     use said central value when reading said image if the first output value converges the predetermined range; and
     continue to calculate another central value from said at least one electric-current set value until another output value of said image device obtained using the other central value converges the predetermined range if the first output value does not converge the predetermined range, and use the other central value when reading said image, if the other output value converges the predetermined range.

2. An image reader according to claim 1, wherein said light source includes a plurality of light emitting elements for emitting the lights of red, green, blue and infrared, and the light amount of said light source is regulated with respect to the light emitting elements of each color.

3. An image reader according to claim 2, wherein said light amount is regulated by utilizing binary search.

4. An image reader according to claim 3, wherein a charge storage time of said imaging device is fixed when regulating said light amount, said charge storage time being set so as to be shorter in an order of the red light, the green light, and the blue light.

5. An image reader according to claim 3, wherein a charge storage time of said imaging device is fixed when regulating said light amount, said charge storage time being set so as to be shorter in an order of the infrared light, the red light, the green light, and the blue light.

6. An image reader according to claim 1, wherein two kinds of scanning are performed when reading said image, one of which is pre-scanning for preliminarily reading said image and the other of which is fine scanning for reading said image under a read condition determined in accordance with said pre-scanning, adjacent pixels of said imaging device being grouped in said pre-scanning to reduce a pixel reading number in comparison with said fine scanning, and said light amount being regulated on the basis of a readout result of said pre-scanning.

7. An image reader according to claim 1, wherein two kinds of scanning are performed when reading said image, one of which is pre-scanning for preliminarily reading said image and the other of which is fine scanning for reading said image under a read condition determined in accordance with said pre-scanning, adjacent pixels of said imaging device being thinned in said pre-scanning to reduce a pixel reading number in comparison with said fine scanning, and said light amount being regulated on the basis of a readout result of said pre-scanning.

8. An image reader according to claim 3, wherein only the electric-current value of the light emitting elements emitting the infrared light is set to a constant value.

9. An image reader according to claim 2, wherein the light amount of said light source is also regulated when adjusting a position of said original, at this time, the electric-current value of said light source being set separately from said electric-current value for reading said image.

10. An image reader according to claim 9, wherein said light emitting elements of one of the red light, the green light, and the blue light are turned on when adjusting the position of said original.

11. An image reader according to claim 9, wherein said light emitting elements of all of the red light, the green light, and the blue light are turned on when adjusting the position of said original.

12. An image reader according to claim 2, wherein said light emitting element is a light emitting diode.

13. An image reader according to claim 12, wherein said light emitting diodes are arranged in matrix.

14. An image reader according to claim 1, wherein said light source is an electroluminescence element, a coloring layer of which includes the respective coloring layers of red, green, and blue.

15. An image reader according to claim 14, wherein said coloring layers of red, green, and blue are arranged in matrix.

16. An image reader according to claim 1, wherein said light source comprises an electroluminescence element, which emits a white light, and filters of red, green, and blue disposed between said electroluminescence element and said original.

17. An image reader according to claim 1, wherein said imaging device is an area CCD.

18. An image reader for reading an image recorded on an original, comprising:
   a light source for emitting a light toward said original;
   an imaging device for receiving the light emitted from said light source and having passed though said original; and
   light-amount regulating means for regulating a light amount of said light source, said light-amount regulating means setting an electric-current value of said light source so as to make an output value of said imaging device converge within predetermined range,
   wherein the electric-current value of said light source used when reading said image is identical with said electric-current value set by said light-amount regulating means,
   wherein an error message is displayed when the light amount of said light emitting elements declines by a prescribed amount or more.

19. An image reader according to claim 1, wherein said light-amount regulating means automatically regulates said light amount again when the light amount of said light emitting elements declines by a prescribed amount or more.

20. An image reader according to claim 18 or 19, wherein the decline of said light amount is detected when said image reader is turned on.

21. An image reader according to claim 18 or 19, wherein the decline of said light amount is detected when said image reader is turned off.

22. An image reader for reading an image recorded on an original, comprising:
   a light source for emitting a light toward said original;
   an imaging device for receiving the light emitted from said light source and having passed through said original; and
   light-amount regulating means for regulating a light amount of said light source, said light-amount regulating means setting an electric-current value of said light source so as to make an output value of said imaging device converge within a predetermined range,
   wherein the electric-current value of said light source used when reading said image is identical with said electric-current value set by said light-amount regulating means,
   wherein said light source includes a plurality of light emitting elements for emitting the lights of red, green, blue and infrared, and the light amount of said light source is regulated with respect to the light emitting elements of each color,
   wherein said light amount is regulated by utilizing binary search, and
   wherein only the electric-current value of the light emitting elements emitting the infrared light is set to a constant value.

* * * * *